No. 637,398. Patented Nov. 21, 1899.
J. MEULI-HILTY.
BICYCLE TRAINER.
(Application filed June 21, 1898. Renewed Oct. 17, 1899.)
(No Model.)
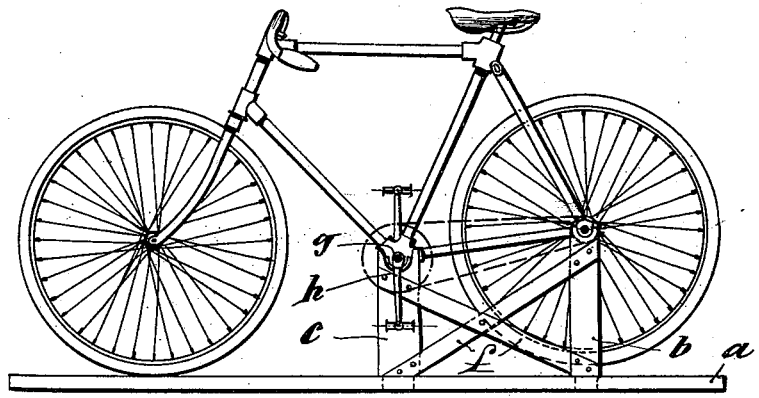
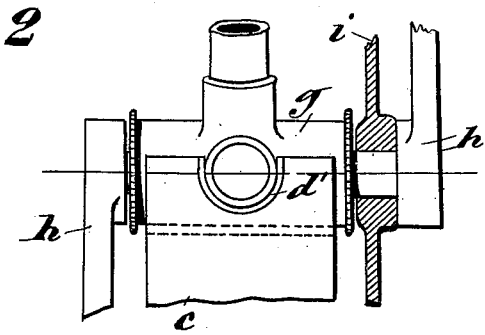
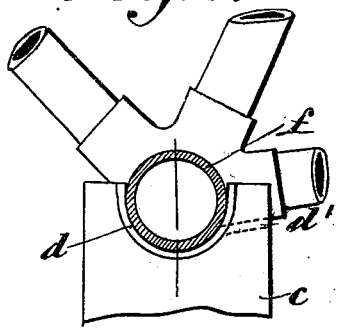
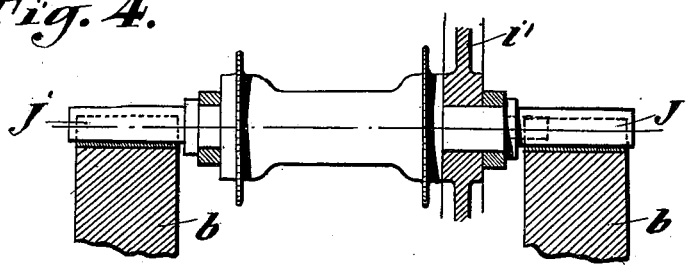
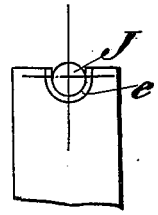

UNITED STATES PATENT OFFICE.

JOHN MEULI-HILTY, OF MAERSTETTEN, SWITZERLAND.

BICYCLE-TRAINER.

SPECIFICATION forming part of Letters Patent No. 637,398, dated November 21, 1899.

Application filed June 21, 1898. Renewed October 17, 1899. Serial No. 733,934. (No model.)

*To all whom it may concern:*

Be it known that I, JOHN MEULI-HILTY, a citizen of Switzerland, residing at Maerstetten, Switzerland, have invented certain new and useful Improvements in Cycle-Stands for Home Training, (for which I have obtained Letters Patent in Switzerland, No. 15,404, dated November 22, 1897,) of which the following is a specification.

The present invention concerns bicycles; and the special object thereof is a support designed for this class of vehicles and enabling the cyclist to train himself at home. This result is obtained by placing the bottom bracket and the axle of the drive-wheel on a suitable support, so that the drive-wheel is slightly lifted from the ground and can turn freely between the uprights of the support, as more fully described and claimed hereinafter.

In the annexed drawings is shown as an example an embodiment of this invention, in which—

Figure 1 is a side elevation of the support, the bicycle being arranged thereupon. Fig. 2 is a detail showing a front view of the bottom bracket and its upright. Fig. 3 is a side view of the bottom bracket and its support. Fig. 4 shows the hub of the drive-wheel, with the two uprights upon which is laid the axle thereof. Fig. 5 is a side view of one of the uprights supporting the drive-wheel.

In the different figures similar letters of reference denote corresponding parts.

$a$ is the bottom plate of the support.

$b$ are the vertical uprights supporting the drive-wheel.

$c$ is the upright supporting the bottom bracket.

$d$ is a felt facing of the upright $c$.

$e$ are also felt linings of the uprights $b$.

$f$ indicates diagonal braces connecting the uprights $b$ and $c$.

$g$ is the bottom bracket of the bicycle.

$h$ are the cranks.

$i$ is the pedal chain-wheel.

$i'$ is the pinion of the drive-wheel, and $j$ and $j'$ are steps.

The support is composed of a bottom plate $a$, upon which are firmly fixed the wooden or metal uprights $b$ and $c$, the said uprights being provided at their upper ends with semicircular grooves with linings $e$ and $d$ and $d'$, of felt or any other suitable material, to prevent the damaging of the varnish of the bicycle by its direct contact with the uprights. The back uprights $b$ are connected with the front upright $c$ by diagonal braces $f$, insuring the rigidity of the support, Fig. 1.

The upright $b$ supports the bottom bracket $g$ of the bicycle, said bracket being lodged in the grooves of said upright, Figs. 2 and 3, and the uprights $b$ support the drive-wheel, the axle of which for this purpose terminates in the two steps $j$ and $j'$, one of which, $j$, exists with all bicycles, and the other, $j'$, is screwed on the end of the axle-pin in lieu of the nut which is generally screwed on, Figs. 4 and 5.

The steps $jj'$ are lodged in the upper grooves of the uprights $b$, and these latter are set sufficiently apart to allow the drive-wheel to revolve freely. The upright $c$ is also arranged between the chain-wheel $i$ and the crank $h$, so as not to hinder their revolving.

It can easily be seen that the leading wheel of the bicycle being placed upon the bottom plate $a$ of the support and the drive-wheel being slightly lifted the bicycle is in its ordinary working position and allows the cyclist to readily exercise.

Having fully described my invention, what I claim, and desire to secure by Letters Patent, is—

In a bicycle-support for training, the combination of a bottom plate or base, a front upright secured in a suitable way to said plate or base and having semicircular grooves on its upper end lined with felt to support the bottom bracket of the bicycle, of two back uprights also secured to the plate or base of the support and having semicircular grooves in their upper ends, the said grooves being lined with felt to support the steps secured at the opposite ends of the axle-pin of the drive-wheel, so as to lift the said wheel, and diagonal braces connecting the back uprights with the front uprights to insure the rigidity of the support, substantially as and for the purpose set forth.

JOHN MEULI-HILTY.

Witnesses:
H. GUISPERT,
L. MURSET.